United States Patent [19]

Seeman

[11] 4,433,240
[45] Feb. 21, 1984

[54] METHOD AND APPARATUS FOR MEASURING GAMMA RAYS IN A BOREHOLE

[75] Inventor: Bronislaw Seeman, Meudon, France

[73] Assignee: Schlumberger Technology Corporation, New York, N.Y.

[21] Appl. No.: 270,670

[22] Filed: Jun. 4, 1981

[30] Foreign Application Priority Data

Jun. 25, 1980 [FR] France .................................. 80 14066

[51] Int. Cl.³ .............................................. G01V 5/00
[52] U.S. Cl. ..................................... 250/256; 250/262
[58] Field of Search ..................... 250/252.1, 253, 256, 250/261, 262, 361 R, 362, 363 R

[56] References Cited

U.S. PATENT DOCUMENTS

| | | | |
|---|---|---|---|
| 3,428,804 | 2/1969 | Comunnetti | 250/252.1 |
| 3,767,921 | 10/1971 | Jones | 250/261 |
| 3,922,541 | 11/1975 | Seeman | 250/252.1 |

OTHER PUBLICATIONS

Hewitt, "On the Resolution Function for Digitally Stabilized Nuclear Spectrometers", *IEEE Trans on Nuc. Science*, vol. NS-17, pp. 242-251, Feb. 1970.
Dudley et al., "Stabilization of a Gamma Scintillation Spectrometer Against Zero and Gain Drifts", *Nuc. Inst. & Meth.* vol. 25, (1964), pp. 297-313.

*Primary Examiner*—Janice A. Howell
*Attorney, Agent, or Firm*—David P. Gordon; Stephen L. Borst

[57] ABSTRACT

A gain stabilization loop for a gamma ray spectroscopy technique uses count rates from a pair of contiguous windows positioned on either side of at least one or more peaks of the detected spectrum. These count rates are combined to generate an error signal which minimizes the statistical errors. The stabilization loop modifies the response of the measurement apparatus so as to cancel the error signal.

29 Claims, 4 Drawing Figures

METHOD AND APPARATUS FOR MEASURING GAMMA RAYS IN A BOREHOLE

This invention relates to nuclear logging techniques used in boreholes and in particular to a method and apparatus for stabilizing the detection of gamma rays coming from formations traversed by a borehole.

There are several known nuclear logging techniques in which gamma rays coming from earth formations are detected. These gamma rays can be due to the natural radioactivity of the formations or result from the irradiation of these formations by a neutron or gamma ray source. The detection of these gamma rays, whether from natural or induced radioactivity, can be carried out separately for several distinct windows or energy ranges in order to obtain information on the energy spectrum of these gamma rays. Analysis of the obtained spectrum then furnishes information on the lithology of the formations. As an example, an apparatus for analyzing the spectrum of natural gamma rays is described in U.S. Pat. No. 3,976,878 (P. Chevalier and B. Seeman).

In that apparatus, the detection system comprises a scintillation crystal, a photomultiplier, a linear amplifier and a pulse height analyzer. The amplifier generates electric pulses whose amplitudes are proportional to the energy of the gamma rays received by the crystal. In the pulse height analyzer the energy spectrum of the gamma rays is divided into five windows by means of comparators having predetermined thresholds $A_1$ to $A_6$. The count rates of the different windows make it possible to calculate the thorium, uranium, and potassium (T, U, K) contents of the formations. In this technique, as in all those using a spectral study, i.e. discrimination by the energy of the received radiation, it is extremely important for measurement accuracy to equip the detection system with gain stabilization means. In fact, gamma ray detection systems and in particular photomultipliers exhibit significant gain variations due especially to temperature changes or changes in the count rates. A stabilization method frequently used and described in the above mentioned patent consists of an auxiliary gamma ray source that emits a characteristic gamma ray whose energy is below the range of interest in the detected spectrum. In this method, an americium source is chosen whose primary emission peak is located at 60 KeV. Two count rates $M_1$ and $N_1$ are measured in two windows of predetermined width located on each side of the 60 KeV energy and an error signal, which is a function of the difference $(M_1-N_1)$, is used to control the high voltage of the photomultiplier through a negative feedback loop. While this stabilization technique makes it possible to reduce measurement errors to 5% in presently used apparatus, it in desirable to improve this accuracy further.

The above described stabilization technique is suitable for those portions of the spectrum close to the emission peak. However, for the same gain variation, the spectrum is shifted by greater amounts at higher energies. Therefore, the detection of the shift at low energies is not entirely satisfactory for correcting shifts at higher energies and, due to statistical variations in the count rates, errors appear. In addition, when large scintillator crystals are used, the low energy gamma rays of the auxiliary source reach only a small part of the crystal and the resulting stabilization is seriously affected by any crystal heterogeneity or by aging effects.

A useful approach is to use, as in U.S. Pat. No. 3,829,686 (W. E. Schultz, et al.) a natural peak at higher energies of the detected spectrum whose exact energy level is known in advance. This approach comes up against a major difficulty in the case of the study of geological formations. The count rate of a given peak is related to the content of a particular element in the examined geological formation. In the case of natural gamma ray spectroscopy, for example, the peak centered on the 1.46 MeV energy is almost entirely due to the presence of potassium in the formation. If the formation contains very little of that element, the corresponding peak disappears and the stabilization based upon it becomes too subject to error to be valid.

The U.S. Pat. No. 3,101,409 (L. E. Fite) also proposes a stabilization using two peaks coming from two auxiliary gamma ray sources. One of the peaks is used to control the high voltage of the photomultiplier while the other peak is used to control the lower threshold of the pulse height discriminator. The two stabilization loops are independent and do not make it possible to solve the case in which one of the peaks is not present. In the patent, this problem is not addressed because the peaks come from two auxiliary monoenergetic gamma ray sources especially added to the apparatus for stabilization.

It is an object of the present invention to provide a gamma ray detection technique that includes a stabilization based upon the detection of several peaks at different energy levels, at least one of which is located in the energy range of the detected spectrum.

It is a further object of the invention to provide a gamma ray logging technique having a detection arrangement particularly well stabilized thanks to the optimal use of gamma rays coming from the traversed formations.

According to one feature of the invention, an apparatus for measuring gamma rays coming from formations traversed by a borehole comprises detection means for converting the received gamma rays into electric pulses whose amplitudes are related to the energy of the gamma rays, and discrimination means for sorting these electric pulses according to their amplitudes in order to furnish information on the energy spectrum of the received gamma rays. Part of the discrimination means separates the electric pulses whose amplitudes fall within two first contiguous windows located on each side of a first predetermined value and within two second contiguous windows located on each side of a second predetermined value. These predetermined values correspond to two reference energies or peaks of the received gamma ray spectrum. At least one of the reference energies is located in the detected spectrum of gamma rays coming from the formations. The apparatus also includes means responsive to the pulses of said two first and said two second windows for generating an error signal. Means controlled by said error signal are provided for modifying the response of the measurement apparatus in order to stabilize said response.

Preferably, the other reference peak is also located within the gamma ray spectrum coming from the formation. To generate the error signal, the apparatus comprises means for furnishing the count rates of the pulses falling within each of said four windows and means for combining the count rates of one or both pairs of contiguous windows to furnish said error signal.

The means for combining the count rates are adapted for calculating the sums and the differences between the count rates of each set of contiguous windows and for combining these sums and differences to minimize the effects of the statistical variations of the count rates. This combination is, for example, the ratio of a first linear function of the differences and a second linear function of the sums. In these linear functions, the sums and differences of the count rates are weighted by predetermined factors according to the central energy of the corresponding peak, the width of the windows flanking the peak and the resolution of the detection means used.

Preferably, the apparatus further includes another stabilization loop based upon an auxiliary gamma ray source whose emission peak is located outside of the detected spectrum of the formations.

According to another feature of the invention, a method for measuring gamma rays coming from formations traversed by a borehole comprises the following steps: converting the received gamma rays into electric pulses whose amplitude is related to the energy of gamma rays and separating these electric pulses according to their amplitudes in order to furnish information on the energy spectrum of the received gamma rays. In particular, one separates the electric pulses whose amplitudes are within two first contiguous windows located on each side of a first predetermined value and within two second contiguous windows located on each side of a second predetermined value. These values correspond to two reference peaks of the received gamma ray spectrum. At least one of the reference peaks is located within the gamma ray spectrum coming from the formations. The pulses of the windows are combined in order to generate an error signal and this error signal is used for modifying the response of the measurement apparatus in order to stabilize this response.

The characteristics and advantages of the invention will appear better from the description to follow given by way of a nonlimitative example with reference to the appended drawings in which:

Figure 1:
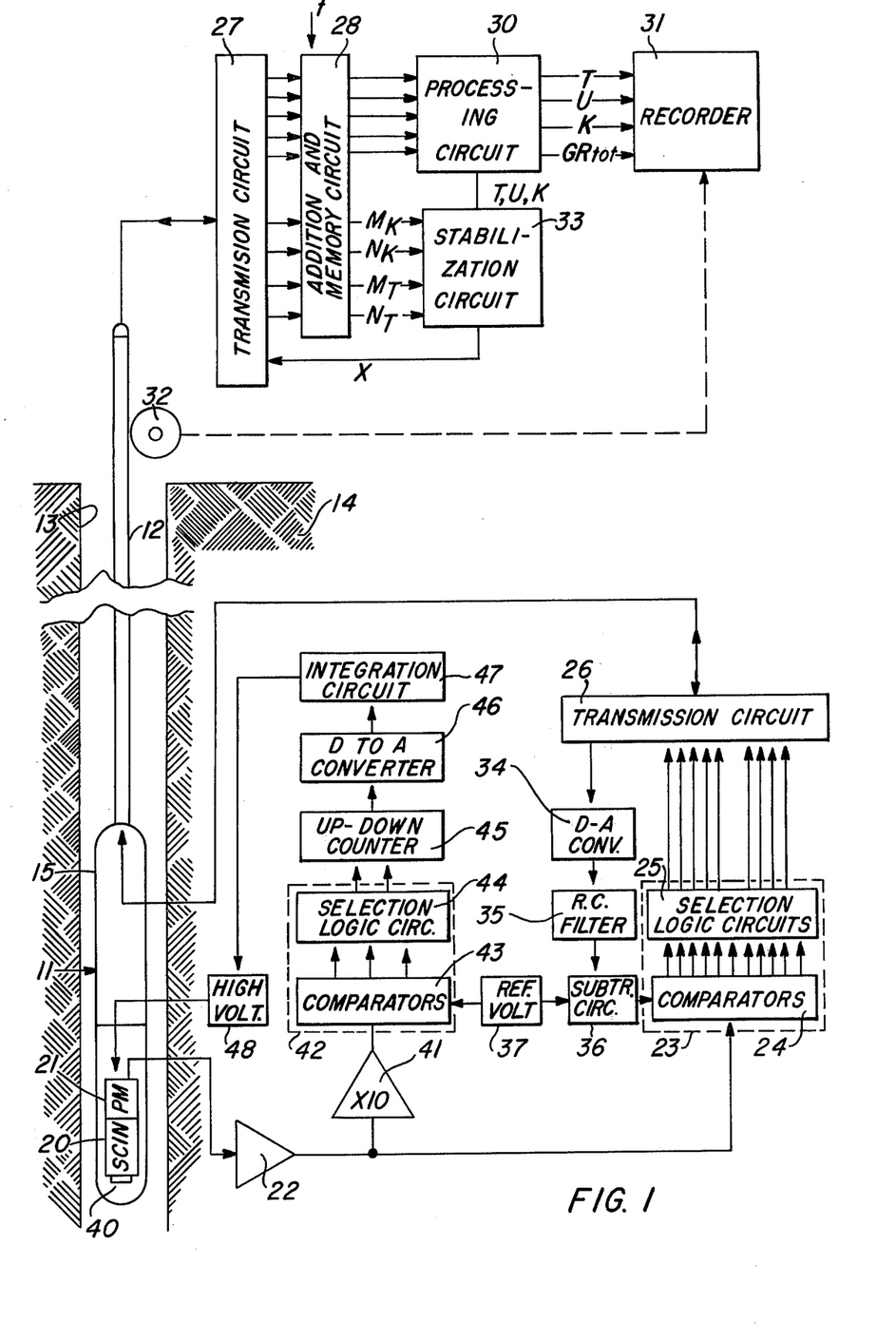
FIG. 1 is a diagram of a gamma ray measurement apparatus according to the invention, shown in a borehole.

Referring to FIG. 1, a logging sonde 11 is suspended from the end of a cable 12 in a borehole 13 which traverses formations 14. The sonde 11 has an upper sealed casing 15 containing electronic circuits forming part of a logging apparatus used for the spectroscopy of natural gamma rays coming from formations 14. This apparatus determines the thorium, uranium and potassium (T, U, K) contents of the formations by spectral analysis of the natural radioactivity of the formations according to the principles described in U.S. Pat. No. 3,976,878 already mentioned. According to the present invention, this apparatus is equipped with a new stabilization system.

As seen earlier, the stabilization of such an apparatus is very important because it affects the accuracy of the measurements. According to the invention, spectrum shifts are detected at one or more energy levels corresponding to peaks of the received spectrum, an error signal is calculated which is a function of these shifts, and the response of the measurement apparatus is stabilized by a negative-feedback loop which tends to cancel this error signal. At least one of the peaks is chosen within the gamma ray spectrum coming from the formations so that the spectrum shift in this range can be reduced or even eliminated during the measurement. The error signal is a function of the shifts which makes the best use, for stabilization, of the gamma ray spectrum coming from the formations.

It is known that the shift of a peak i of the spectrum can be detected by means of a parameter called the form factor $F_i$ given by the equation:

$$F_i = \frac{M_i - N_i}{M_i + N_i} \quad (1)$$

in which $M_i$ and $N_i$ are the count rates of the gamma rays in two windows of width $W_i$ on each side of a predetermined value $E_i$ at which should be located the mean energy of the peak. Assuming that the form of the investigated peak is Gaussian, it is found that the detected shift $\Delta E_i = E - E_i$ of the peak, where E is the energy of the shifted peak, can be expressed as a function of the form factor by the equation:

$$\Delta E_i = H_i F_i \quad (2)$$

in which $H_i$ is a constant determined by the energy of the respective peak $E_i$, of the width $W_i$ of the respective detection windows and of the resolution $R_i$ of the detector at the respective energy level. The coefficient $H_i$ can be predetermined for a peak $E_i$ by the equation:

$$H_i = \frac{\int_{E_i - W_i}^{E_i + W_i} \exp\left[-2.77 \frac{(E - E_i)^2}{R_i^2 E_i^2}\right] dE}{2E_i \left[-1 + \exp\left(-2.77 \frac{W_i^2}{R_i^2 E_i^2}\right)\right]} \quad (3)$$

According to the invention, an error signal X is generated which is a linear function of the form factors of several peaks.

$$X = \Sigma_i A_i \Delta E_i = \Sigma_i A_i H_i F_i \quad (4)$$

The weighting coefficients $A_i$ are chosen so as to minimize the effect of statistical errors. In fact, these statistical errors could introduce incoherences into the stabilization, particularly when the amplitude of one of the detected peaks becomes very low, in which case the corresponding form factor $F_i$, is no longer meaningful. To satisfy this condition, the coefficients are determined so as to minimize the variance $\sigma_X^2$ of X.

The equations (2) and (4) give:

$$X \triangleq \Sigma_i A_i H_i F_i \quad (5)$$

If the variance of $F_i$ is $\sigma_{Fi}^2$, the variance of X is the following according to the theorem of the addition of variances:

$$\sigma_X^2 = \Sigma_i A_i^2 H_i^2 \sigma_{Fi}^2 \quad (6)$$

Calculation shows that $\sigma_X^2$ is at a minimum for:

$$A_i = \frac{1}{H_i^2 \sigma_{Fi}^2} / \Sigma_i \frac{1}{H_i^2 \sigma_{Fi}^2} \qquad (7)$$

We can take as a value for $\sigma_{Fi}^2$:

$$\sigma_{Fi}^2 = 1/(M_i + N_i) \qquad (8)$$

Hence:

$$A_i H_i = \frac{M_i + N_i}{H_i} / \Sigma_i \frac{M_i + N_i}{H_i^2} \qquad (9)$$

Combining the equations (1), (5) and (9), we find:

$$X = \frac{\Sigma_i \left[ \frac{(M_i - N_i)}{H_i} \right]}{\Sigma_i \left[ \frac{(M_i + N_i)}{H_i^2} \right]} \qquad (10)$$

It is also possible to calculate the variance $\sigma_x^2$ by replacing in equation (6) the values of $A_i$ and $\sigma_{Fi}^2$ according to equations (7) and (8) to obtain:

$$\sigma_x^2 = 1/\Sigma_i \left[ \frac{M_i + N_i}{H_i^2} \right] \qquad (11)$$

According to this latter equation, it is seen that if one of the peaks is absent, the quantity $(M_i + N_i)$ corresponding to this peak is zero. In other words, the contribution of this peak to the error signal is zero and the stabilization is provided entirely by the shifts detected at the other peaks. On the other hand, as soon as the previously absent peak takes on a significant amplitude, the variance $\sigma_x^2$ decreases and this peak participates actively in the stabilization.

Figure 3:
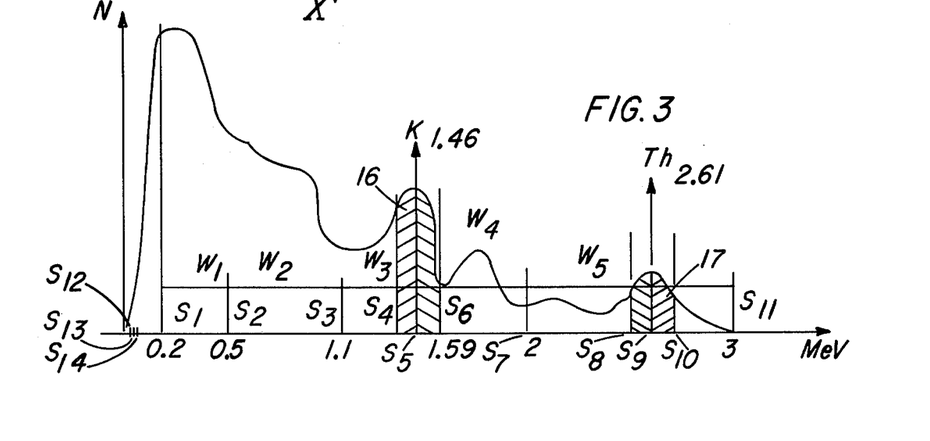
FIG. 3 is a representation of a received gamma ray spectrum coming from the formations.

In the embodiment of FIG. 1 for the spectral study of the radioactivity of formations, the stabilization is achieved by means of two negative-feedback loops, one of which uses two peaks of the gamma ray spectrum coming from the formations to produce an error signal. FIG. 3 represents an example of the natural gamma ray spectrum coming from the formations. In this spectrum are noted several peaks and in particular a peak 16 at 1.46 MeV due mainly to the presence of potassium in the formations, and a peak 17 at 2.61 MeV due mainly to the presence of thorium. In the described embodiment, these two peaks are used for a stabilization loop.

Referring again to FIG. 1, the sonde 11 contains, in a conventional manner, a scintillation crystal 20, for example, of the sodium iodide type, followed by a photomultiplier 21 which converts the received gamma rays into electric pulses whose amplitudes are proportional to the energy of the gamma rays. These pulses are amplified by a linear amplifier 22 and then applied to a pulse height discriminator 23. The discriminator 23 comprises eleven comparators 24 whose reference thresholds are chosen as shown at $S_1$ to $S_{11}$ in FIG. 3. In the example chosen, the thresholds $S_1$ to $S_{11}$ are taken respectively equal to 200, 500, 1100, 1365, 1460, 1590, 2000, 2520, 2615, 2745 and 3000 KeV. Each comparator furnishes only one output pulse for an input pulse whose amplitude is higher than the threshold of the comparator.

The eleven outputs of the comparators are connected to selection logic circuits 25 or anticoincidence circuits which classify the pulses falling within nine different windows. Five windows $W_1$ to $W_5$ (see FIG. 3) are used for the measurements proper as indicated in U.S. Pat. No. 3,976,878 already mentioned. These measurement windows are those falling within the thresholds ($S_1$-$S_2$), ($S_2$-$S_3$), ($S_3$-$S_6$), ($S_6$-$S_7$) and ($S_7$-$S_{11}$). Four windows are used for stabilization. They include two first windows ($S_4$-$S_5$) and ($S_5$-$S_6$) on each side of the value 1460 KeV and two second windows ($S_8$-$S_9$) and ($S_9$-$S_{10}$) on each side of the value 2615 KeV. For each window, an anticoincidence logic circuit selects the pulses whose amplitude is between two thresholds.

The pulses thus classified by amplitude into nine windows are applied to a transmission circuit 26 to be sent to the surface via the cable. These circuits 26 can be of the type described in French Pat. No. 2,379,694 (inventors A. Belaigues, et al., corresponding to U.S. patent application Ser. No. 872,504 filed Jan. 26, 1978, now abandoned and continued as Ser. No. 63,220, filed Aug. 6, 1979, and issued as U.S. Pat. No. 4,355,310 on Oct. 19, 1982), to transmit control or data words between the sonde 11 and the surface. The pulses of the nine windows can be transmitted, for example, in the form of nine binary words each representing the number of pulses of a window for a period of 16 milliseconds (1/60 sec.). The circuits 22 to 26 are placed in the sealed casing 15.

The information reaching the surface is received by other transmission circuits 27 which apply the nine count rates to an addition and memory circuit 28 which carries out and stores the sum of the pulses in each window for a time period adjustable from 1 to 4 seconds.

The count rates in the five measurement windows are applied to a processing circuit 30 which combines these count rates to generate signals representative of the thorium, uranium and potassium (T,U,K) contents of the formations, as explained in U.S. Pat. No. 3,976,878 already mentioned. The processing circuit 30 also furnishes the total natural radioactivity GRtot by an addition of the count rates of the five windows. These results are recorded by, for example, a magnetic recorder and also in graphic form on a film. A recording is carried out as a function of the depth detected by a wheel 32 in contact with the cable 12.

The count rates in the four stabilization windows are applied to a stabilization circuit 33 which generates an error signal X according to the equation (10). This error signal X is applied to the surface transmission circuits 27 which transmits it via the conductors of the cable 12 to the sonde transmission circuits 26. After demodulation, the error signal X is applied to a digital-to-analog converter 34 and then to a filter 35 which can be, for example, an RC filter with a time constant of the order of 100 seconds so as to render statistical variations negligible. The output of the filter 35 is connected to a subtraction circuit 36 which subtracts the error signal from a reference voltage provided by power supply 37 to produce a modulated voltage signal which varies in response to the error signal. The voltage signal thus modulated determines the threshold values of the comparators 24. The circuit 36 is adapted to reduce or increase proportionally the threshold values when the error signal X indicates a spectrum shift toward lower or higher energies respectively.

The apparatus further includes a second stabilization loop of the rapid action type which uses an auxiliary gamma ray source 40. This source 40 placed in the sonde 11 is an americium 241 source with an emission peak centered on the value 60 KeV, which is below the detected spectrum of the gamma rays coming from the formations. The gamma rays coming from the auxiliary source 40 produce, at the output of the amplifier 22, electric pulses applied to an amplifier 41 with a gain of ten.

The output of the amplifier 41 is applied to a pulse height analyzer 42 made up of three comparators 43 and of selection logic circuits 44. The comparators 43, whose threshold values come from a voltage divider supplied by the reference voltage 37, separate the pulses into one of three outputs corresponding to pulses whose amplitudes are respectively higher than three thresholds $S_{12}$, $S_{13}$ and $S_{14}$. Thresholds $S_{12}$, $S_{13}$ and $S_{14}$ correspond to gamma ray energies of 40, 60 and 80 KeV, all of which are below the detected spectrum coming from the formations (see FIG. 3).

The selection logic circuits 44 are designed to sort the pulses into two outputs: one output comprising those pulses whose amplitudes are between the $S_{12}$ and $S_{13}$ thresholds and the other comprising those pulses whose amplitudes are between thresholds $S_{13}$ and $S_{14}$. Thus, the pulses in the region of the americium peak are separated into two windows located on each side of the 60 KeV energy. Both outputs of the logic circuit 44 are connected respectively to the positive and negative inputs of an adder-subtractor circuit 45 which generates a signal representative of the difference $M_{Am}-N_{Am}$ of the count rates of the pulse falling within the two windows of the americium. The output of the adder-subtractor 45 is applied to a digital-to-analog converter 46 and then to an integration circuit 47 having a time constant of a few seconds to furnish an error signal to control the high voltage power supply 48 of the photomultiplier 21. In this manner, the gain of the photomultiplier is increased when the americium peak is shifted toward the low energies, i.e. when the count rate $M_{Am}$ of the lower window becomes higher than $N_{Am}$ of the upper window. Circuits 34 to 48 are disposed within the sealed casing 15.

The second stabilization loop based upon the americium peak and acting on the gain of the photomultiplier has the greatest and fastest (a few seconds) corrective effect. Alternatively, this loop could be designed to act on the gain of the amplifier 22 or on the reference voltage 37. The first stabilization loop, based upon the potassium and thorium peaks, has a slower action (100 seconds for example) and refines the effect of the second. The measurement error thus obtained is smaller than one percent.

Figure 2:
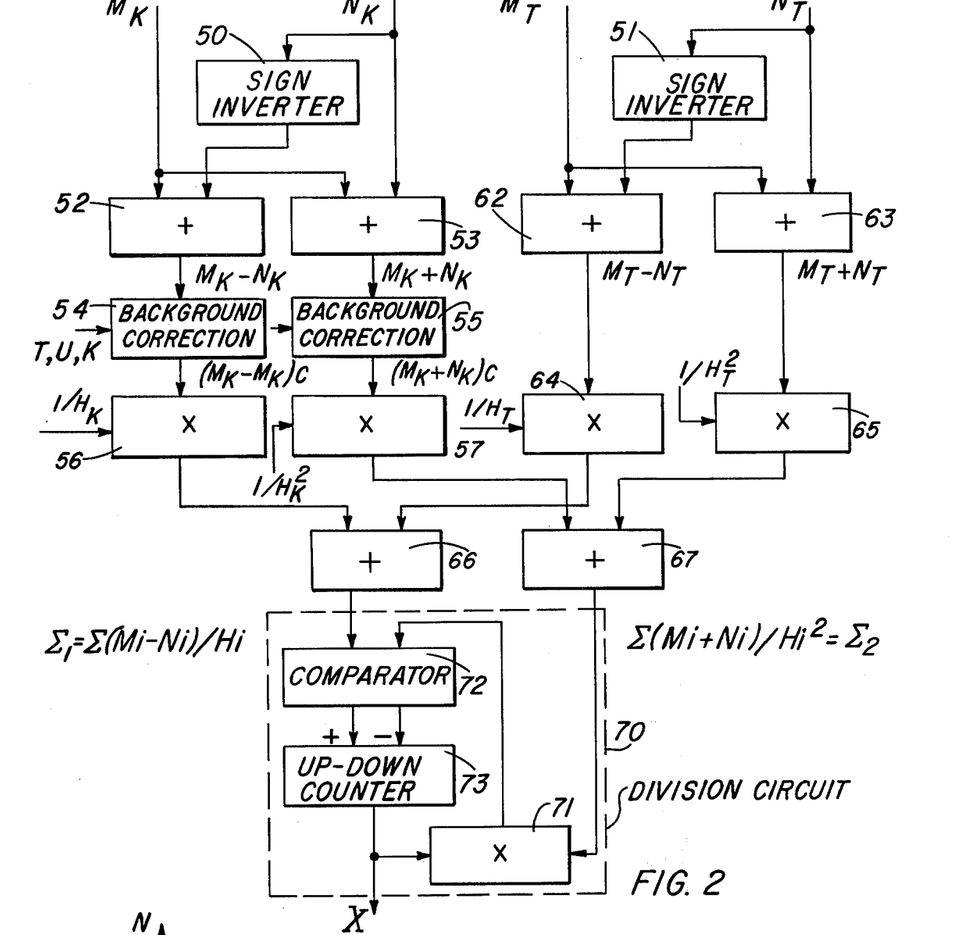
FIG. 2 is a diagram of a first embodiment of part of the apparatus of FIG. 1.

FIG. 2 represents in greater detail a first embodiment, in the form of circuits, of the stabilization circuit 33. This circuit receives, during the time t, the count rates $M_K$, $N_K$, $M_T$ and $N_T$ of the pulses in the two potassium windows and the two thorium windows. The count rates $N_K$ and $N_T$ are applied to two sign inversion circuits 50 and 51 which calculate respectively the numbers $-N_K$ and $-N_T$. The output of the circuit 50 is applied to an addition circuit 52 which also receives the count rate $M_K$ to furnish signals representative of the difference $(M_K-N_K)$. Another addition circuit 53 receives the signals $M_K$ and $N_K$ to calculate the sum $(M_K+N_K)$. Background corrections are then carried out on the difference $(M_K-N_K)$ and the sum $(M_K+N_K)$ by means of two circuits 54 and 55.

These corrections improve the accuracy obtained by stabilization. The potassium peak has a background coming both from thorium and uranium. Furthermore, the count rate of the lower window of potassium is too high owing to the Compton effect background coming from the potassium itself. Circuit 54, responsive to T, U, and K input signals, calculates the difference $B_d$ between the backgrounds of the two windows of potassium by the equation:

$$B_d = (B_{MK} - B_{NK}) = a_1 T + a_2 U + a_3 K \tag{12}$$

The coefficients $a_1$, $a_2$ and $a_3$ are predetermined in a calibration well by placing the apparatus successively opposite several artificial formations of which the T, U, K contents are known. Once the background difference has been determined in circuit 54 it is then subtracted from the difference of the count rates.

Similarly, circuit 55 calculates the sum $B_s$ of the backgrounds in the two windows by the equation:

$$B_s = b_1 T + b_2 U + b_3 K \tag{13}$$

in which the coefficients $b_1$, $b_2$ and $b_3$ are also predetermined in a calibration well. Element 55 then subtracts $B_s$ from the sum of the count rates $(M_K H + N_K)$.

The corrected difference $(M_K - N_K)_C$ is applied to a multiplication circuit 56 to be multiplied by the predetermined coefficient $1/H_K$. As seen earlier, this weighting coefficient depends on the window widths, on the central energy of the peak and on the resolution of the detector used (equation 3). In the described example, this coefficient $1/H_K$ is 24.58 for a detector whose resolution for cesium was 10%. The corrected sum $(M_K + N_K)_C$ is applied to a multiplication circuit 57 to be multiplied by a coefficient equal to $1/H_K^2$.

In a symmetrical manner, the count rate $M_T$ and the complement of the count rate $N_T$ are applied to an addition circuit 62 which calculates the difference $M_T - N_T$. The two count rates $M_T$ and $N_T$ are added in an addition circuit 63. The thorium peak has a background due mainly to uranium and it is possible to consider background corrections on the sum and the difference of the count rates in the same manner as for the potassium peak. However, as this background is much smaller than that of potassium, one may omit the background correction step and proceed directly to apply the weighting factors $1/H_T$ and $1/H_T^2$ by means of the multiplication circuits 64 and 65. In the example, with the chosen window widths, the factor $1/H_T$ was taken equal to 31.51 for the same detector as that which was mentioned above. The circuits 56 and 64 are connected to an addition circuit 66 which calculates the weighted sum $\Sigma_1$ of the corrected differences of the count rates:

$$\Sigma_1 = \Sigma(M_i - N_i)/H_i = (M_K - N_K)_C/H_K + (M_T - N_T)_C/H_T \tag{14}$$

The circuits 57 and 65 are connected to an addition circuit 67 which calculates the weighted sum $\Sigma_2$ of the corrected sum of the count rates:

$$\Sigma_2 = \Sigma(M_i - N_i)/H_i^2 = (M_K - N_K)_C/H_K^2 + (M_T - N_T)_C/H_T^2 \tag{15}$$

The output signals of the circuits 66 and 67 are applied to a division circuit 70 which calculates the ratio $\Sigma_1/\Sigma_2$, i.e., the error signal X according to the equation (10). The division circuit 70 includes mainly a multiplier 71, a comparator 72 and an adder-subtractor 73. The $\Sigma_1$ from circuit 66 and the output of the multiplier 71 are applied to the input of the comparator 72 whose outputs are applied to the adder-subtractor 73. In this way, the output A of the multiplier is equal to $A = X\Sigma_2$ and the comparator 72 has the effect of equalling A and $\Sigma_1$. Consequently, the output of the adder-subtractor 73 is indeed equal to the ratio:

$$X = \Sigma_1/\Sigma_2$$

The multiplication circuits used are commercially available units bearing trade identification MPY-12HJ sold by the TRW Company, California, United States.

Figure 4:
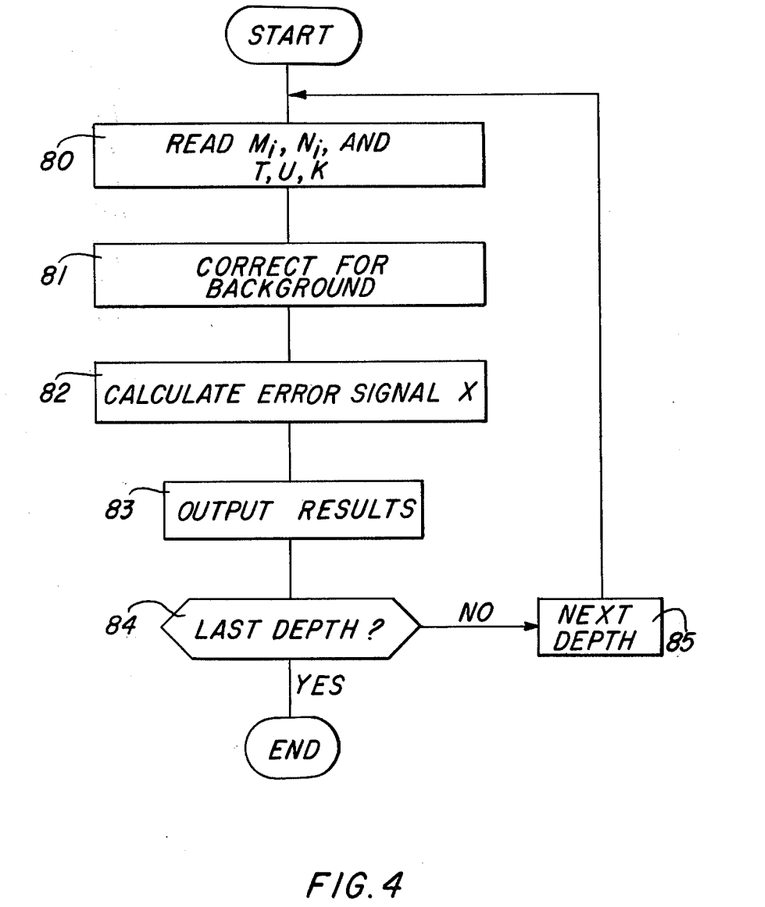
FIG. 4 is a flow chart of the sequence of operations carried out in another embodiment which is a variant of that of FIG. 2.

In another embodiment, the computer 33 can be a general purpose computer programmed suitably to furnish the signal X. A general flowchart of the operations to be carried out is shown in FIG. 4. First of all, one reads the count rates $M_K$, $N_K$, $M_T$, $N_T$ and the T, U and K contents are calculated (block 80). One then corrects the count rates for the background by subtracting, for example, from each count rate a number of counts calculated by a linear function of the T, U and K contents (block 81). The error signal X is then calculated (block 82) by the equation (10) and this calculated value is extracted from the error signal to apply it to the transmission circuits 27 (block 83). This calculation is carried out in real time for each depth level at which the sonde 11 is located as represented by the blocks 84 and 85. This embodiment is equivalent to that of FIG. 2.

In the same manner, the count rates $M_{Am}$ and $N_{Am}$ of the americium peak could be transmitted to the surface and the error signal for the corresponding stabilization could be calculated at the surface by a programmed computer and then retransmitted downhole to control the gain of the measurement apparatus.

It will be noted that for each peak (potassium or thorium), the contiguous detection windows are of unequal width. In the example, these widths are 95 KeV for the lower window and 130 KeV for the upper window. The upper window is larger in order to take into account the reduction in the resolution of the detector as energy increases as well as the fact that at higher energies the influence of the background is smaller so a larger window enables the detection of more counts.

Many variants can be applied to the embodiments described without departing from the framework of the invention. In particular, the error signal can be calculated from a number of reference peaks higher than two, using the formula (10). Instead of two stabilization loops, it is possible to combine the count rates of the gamma rays coming from the auxiliary monoenergetic source and the count rates of one or more peaks of the detected spectrum coming from the formations. The filtering achieved by the circuit 35 could be carried out by a program step added to the flowchart of FIG. 4. Additionally, the error signal X may be applied to control high voltage element 48 or the amplifier 22.

I claim:

1. An apparatus for measuring gamma rays coming from formations traversed by a borehole, comprising:
   detection means for converting the gamma rays into electric pulses whose amplitudes are related to the energies of the gamma rays;
   discrimination means for sorting these electric pulses according to their amplitudes in order to furnish information on the energy spectrum of the received gamma rays, said discrimination means comprising means for separating the electric pulses at least into two first contiguous windows located on each side of a first predetermined value and into two second contiguous windows located on each side of a second predetermined value, said predetermined values corresponding to two reference peaks wherein at least one of said reference peaks is a peak provided by thorium, uranium, or potassium gamma ray spectra coming from the formations;
   means responsive to the pulses of said first and second windows in order to generate an error signal; and
   means responsive to said error signal for modifying the response of the measurement apparatus in order to stabilize said response.

2. The apparatus according to claim 1, characterized in that the other reference peak is another peak provided by the thorium, uranium or potassium gamma ray spectra coming from the formations, 3. The apparatus according to claim 2, characterized in that the means for generating the error signal include means for furnishing the count rates of pulses falling within each of said windows, and first and second linear function calculation means for combining the count rates to furnish said error signal.

4. The apparatus according to claim 3, characterized in that the means for generating the error signal comprises means for correcting the count rates to take into account the background.

5. The apparatus according to claim 1, characterized in that the means for generating the error signal includes means for furnishing the count rates of pulses falling within each of said windows, and first and second linear function calculation means for combining the count rates to furnish said error signal.

6. The apparatus according to claim 5, characterized in that said first and second linear function calculation means for combining the count rates includes means for calculating the differences between the count rates of said contiguous windows, and for combining said differences so as to minimize the effects of the statistical variations of said count rates.

7. The apparatus according to claim 6, characterized in that said first and second linear function calculation means for combining the count rates further include means for calculating the sums of the count rates in said contiguous windows, means for calculating a first linear function of said differences, means for calculating a second linear function of said sums, and means for calculating the ratio of the first function to the second function in order to obtain the error signal.

8. The apparatus according to claim 7, characterized in that said means for calculating said first function includes means for carrying out a weighted sum of the differences of the count rates and for calculating said second function by carrying out a weighted sum of the sums of the count rates.

9. The apparatus according to claim 8, characterized in that said means for combining the count rates includes means for weighting each of the differences of the count rates by a factor predetermined according to the central energy of the corresponding reference peak, the width of the windows corresponding to this reference peak and the resolution of the detection means used.

10. The apparatus according to claim 9, wherein said means for combining the count rates includes means for weighting each of the sums of the count rates by a second predetermined factor equal to the square of the weighting factor applied to the corresponding difference of the count rates.

11. The apparatus according to any one of claims 5, 6, 7, 8, 9, or 10, characterized in that the means for generating the error signal comprises means for correcting the count rates to take into account the background.

12. The apparatus according to any of claims 1 or 2, characterized by further comprising an auxiliary source for emitting monoenergetic gamma rays outside of the investigated range of gamma rays coming from the formations, and means sensitive to the gamma rays emitted by said auxiliary source for carrying out a second stabilization of the response of the measurement apparatus.

13. The apparatus according to claim 12, characterized in that the discrimination means comprises means for separating the electric pulses whose amplitudes fall within two third contiguous windows located on each side of a third value corresponding to the peak of gamma rays emitted by the auxiliary source, and in that said means for carrying out the second stabilization comprises means for combining the pulses of said two third contiguous windows in order to generate a second error signal, and means controlled by the second error signal for modifying the response of said analysis device.

14. The apparatus according to claim 13, characterized in that the means controlled by the second error signal includes means for modifying the gain of said detection means.

15. The apparatus according to claim 14, characterized in that the means controlled by the first error signal includes means for modifying certain comparison thresholds of said discrimination means without having an influence on said second error signal.

16. A method for determining characteristics of geological formations traversed by a borehole by detecting gamma rays coming from said formations, comprising the following steps:
converting the received gamma rays into electric pulses whose amplitudes are related to the energies of the gamma rays,
classifying these electric pulses according to their amplitudes in order to furnish information on the energy spectrum of the received gamma rays, said step of classifying including the step of separating the electric pulses at least into two first contiguous windows located on each side of a first predetermined value and into two second contiguous windows located on each side of a second predetermined value, these predetermined values corresponding to two reference peaks wherein at least one of said reference peaks is a peak provided by the thorium, uranium or potassium spectra coming from the formations and, consequently, capable of disappearing;
generating an error signal in response to the pulses of said first and second windows; and
in response to said error signal, stabilizing the electric pulses which correspond to said gamma ray energy spectrum.

17. The method according to claim 16, characterized in that the other reference peak is another peak provided by the thorium, uranium or potassium gamma ray spectra coming from the formations.

18. The method according to claim 17, characterized in that the error signal generation step comprises the following steps:
producing the count rates of the pulses falling within each of said windows;
calculating the sums and differences of the count rates of contiguous windows; and
calculating the ratio between a first linear function of said differences and a second linear function of said sums in order to obtain the error signal.

19. The method according to claim 18, characterized in that it further comprises a step consisting in correcting the count rates to take into account the background.

20. The method according to claim 18 characterized in that it further comprises the following steps:
emitting monoenergetic gamma rays outside of the investigated range of gamma rays coming from the formations; and
modifying said classifying step in response to the detected monoenergetic gamma rays in order to carry out a second stabilization of said measurement.

21. The method according to claim 16, characterized in that the error signal generation step comprises the following steps:
producing the count rates of the pulses falling within each of said windows;
calculating the sums and differences of the count rates of contiguous windows; and
calculating the ratio between a first linear function of said differences and a second linear function of said sums in order to obtain the error signal.

22. The method according to claim 21, characterized in that said first linear function is calculated by carrying out a weighted sum of said differences of the count rates and said second linear function is calculated by carrying out a weighted sum of said sums of the count rates.

23. The method according to claim 22, characterized in that the weighting factors used for calculating the first linear function are predetermined factors depending on the central energy of the corresponding reference peak, the width of the windows corresponding to this reference peak and the resolution appropriate for converting the received gamma rays into pulses.

24. The method according to claim 23, characterized in that the weighting factors used for calculating the second linear function are taken equal to the squares of the weighting factors used for calculating the first linear function.

25. The method according to any one of claims 21, 22, 23 or 24, characterized in that it further comprises a step consisting in correcting the count rates to take into account the background.

26. The method according to claim 25 characterized in that it further comprises the following steps:
emitting monoenergetic gamma rays outside of the investigated range of gamma rays coming from the formations; and
modifying said classifying step in response to the detected monoenergetic gamma rays in order to carry out a second stabilization of said measurement.

27. The method according to claim 26, characterized in that it comprises the following steps:
separating the electric pulses into two third contiguous windows located on each side of a third determined value corresponding to the peak of the gamma rays emitted by the auxiliary source; and combining the pulses of said third windows in order to generate a second error signal to carry out said second stabilization.

28. The method according to claim 27, characterized in that it comprises the step consisting in modifying, by the second error signal, said step for converting the gamma rays into electric pulses.

29. The method according to claim 28, characterized in that it comprises the step consisting in modifying, by the first error signal, certain comparison thresholds of said electric pulse sorting step.

* * * * *